3,014,905
PROCESS FOR MAKING 16,17-EPOXY STEROIDS USING t-BUTYL HYDROPEROXIDE
Nien-Chu C. Yang, Chicago, Ill., Richard A. Finnegan, Detroit, Mich., and Richard E. Ray, Morton Grove, Ill., assignors to G. D. Searle & Co., Chicago, Ill., a corporation of Delaware
No Drawing. Filed Jan. 15, 1959, Ser. No. 786,913
7 Claims. (Cl. 260—239.55)

The present invention relates to a novel method for the selective epoxidation of $\Delta^{16}$-20-oxo steroids to the corresponding $16\alpha,17\alpha$-epoxy-20-oxo derivatives.

Typically, the selective epoxidation in the 16,17-position is conducted on compounds of the structural formula

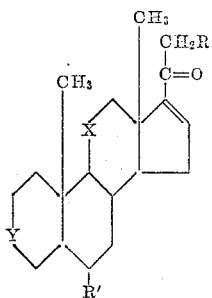

wherein R is a member of the class consisting of hydrogen, hydroxyl, and radicals of the type —OAcyl; R' is hydrogen or methyl, X is a member of the class consisting of —CH$_2$—, —CHOH—, and —C=O—; and Y is a member of the class consisting of —CHOH—, —C=O—, and —CHOAcyl-. In the foregoing formula at least one additional double bond should be present in one of the positions 4(5) or 5(6) and a double bond can also be present in the 1(2)-position. The acyl radicals are those derived from saturated aliphatic hydrocarbon carboxylic acids and include formyl, acetyl, propionyl, butyryl, pentanoyl, and hexanoyl. Of special importance is the selective epoxidation of the corresponding 6- and 12-methyl derivatives and the 6,12-dimethyl derivatives.

The selective epoxidation in the 16,17-position is conveniently carried out by contacting the corresponding 4(5),16 or 5(6),16-pregnadiene or the corresponding $\Delta^{1,2}$-pregnatriene analog with tertiary butyl hydroperoxide in the presence of a catalytic amount of a weak base in an inert solvent. Among the weak bases which can be employed are dilute potassium hydroxide, benzyltrimethylammonium hydroxide and similar quaternary ammonium hydroxides. Suitable inert solvents include benzene and homologous aromatic hydrocarbons, tertiary butanol and pentanol.

This novel procedure is selective to the 16,17-position and does not cause epoxidation of polyunsaturated steroids having double bonds in the 1(2) and in the 4(5)-positions as do the conventional methods using hydrogen peroxide and alkali or the peroxy acids. Since none of the other epoxides are formed, time consuming and costly separation procedures are eliminated. Furthermore, the present invention affords a higher yield of the 16,17-epoxides than the older methods.

The invention will be further illustrated by the following examples which are to be construed as illustrative only and not limiting this invention either in spirit or in scope. It will be apparent to those skilled in the art of organic synthesis that many modifications both of materials and methods may be practiced without departing from the invention. In these examples quantities of materials are given in parts by weight and temperatures in degrees centigrade (° C.).

*Example 1*

A solution of 1 part of 16-dehydroprogesterone, 0.6 part of tertiary butyl hydroperoxide, 0.05 part of a 35% methanolic solution of benzyltrimethylammonium hydroxide and 5.3 parts of benzene is allowed to stand at room temperature for 12 hours. At the end of this time the reaction mixture is washed with water. The aqueous washings are saturated with sodium chloride and extracted with ether. The organic extracts are combined, dried over anhydrous magnesium sulfate, and evaporated to dryness under reduced pressure. Upon recrystallization from methanol there is obtained $16\alpha,17\alpha$-epoxy-4-pregnene-3,20-dione melting at about 205–207° C., with $[\alpha]_D^{27}$ of +156.6°. Absorption is observed in the infrared at 5.87, 6.03, 6.21 and 11.29 microns.

Substitution of an equimolar amount of 21-hydroxy-4,16-pregnadiene-3,20-dione or 21-acetoxy-4,16-pregnadiene-3,20-dione for the 16-dehydroprogesterone in the preceding paragraph of this example yields $16\alpha,17\alpha$-epoxy-21-hydroxy-4-pregnene-3,20-dione melting at about 191–193° C.

Substitution of an equimolar amount of $6\alpha$-methyl-16-dehydroprogesterone for the 16-dehydroprogesterone in the first paragraph of this example yields $6\alpha$-methyl-$16\alpha$,$17\alpha$-epoxy-4-pregnene-3,20-dione melting at about 145–147° C.

*Example 2*

A solution of 0.5 part of 1,4,16-pregnatriene-3,20-dione, 0.91 part of a 62% methanolic solution of tertiary butyl hydroperoxide, 0.09 part of potassium hydroxide, 4.7 parts of tertiary butyl alcohol and 0.5 part of water is dissolved in 21 parts of tertiary butanol. The mixture is allowed to stand at room temperature for 4 hours and then cold water is slowly added until crystals appear. The resulting crystalline mixture is cooled to 0° C. and permitted to stand for 1 hour. The crystals are then filtered, dried and recrystallized from a mixture of methanol and water. In this manner there is obtained $16\alpha,17\alpha$-epoxy-1,4-pregnadiene-3,20-dione melting at about 180–183° C. The compound shows absorption in the ultraviolet at 244 millimicrons with an extinction coefficient of 16,900. Infrared maxima are observed at 5.85, 6.01 and 6.17 microns.

Substitution of an equimolar amount of 21-hydroxy-1,4,16-pregnatriene-3,20-dione or 21-acetoxy-1,4,16-pregnatriene-3,20-dione for the 1,4,16-pregnatriene-3,20-dione in the preceding paragraph of this example yields $16\alpha,17\alpha$-epoxy-21-hydroxy-1,4-pregnadiene-3,20-dione. The compound shows absorption in the ultraviolet at 244 millimicrons with a molecular extinction coefficient of 16,500.

*Example 3*

To a solution of 2 parts of $3\beta$-hydroxy-5(6),16-pregnadien-20-one in 86 parts of tertiary butanol is added a solution of 0.39 part of potassium hydroxide dissolved in 19.2 parts of tertiary butanol, 2 parts of water, and 3.62 parts of a 62% methanolic solution of tertiary butyl hydroperoxide. The mixture is allowed to stand at room temperature for 7 hours. At the end of this time sufficient water is added to the reaction mixture to reduce the alcohol content to 15%. The solution is extracted with ether. The ethereal extracts are dried over magnesium sulfate and taken to dryness under vacuum. Upon recrystallization from a mixture of methanol and water there is obtained $3\beta$-hydroxy-$16\alpha,17\alpha$-epoxy-5(6)-pregnen-20-one melting at about 192–193° C. Infrared maxima are observed at 2.77 and 5.83 microns.

Substitution of an equimolar amount of $3\beta$,21-dihydroxy-5(6),16-pregnadien-20-one or $3\beta$,21-diacetoxy-5(6),16-pregnadien-20-one for the $3\beta$-hydroxy-5(6),16-pregnadien-20-one in the preceding paragraph of this example yields 3,21-dihydroxy-16α,17α-epoxy - 5(6)-pregnen-20-one.

*Example 4*

To a solution of 2 parts of 3β-acetoxy-6-methyl-5(6),-16-pregnadien-20-one in 88 parts of tertiary butyl alcohol is added a solution of 0.86 part of potassium hydroxide dissolved in 44 parts of tertiary butanol, 4 parts of water, and 20 parts of a 62% methanolic solution of tertiary butyl hydroperoxide. The mixture is stirred at room temperature for 5 hours. At the end of this time sufficient water is added to the reaction mixture to reduce the alcohol content to 15%. The product is collected by filtration. Upon recrystallization from a mixture of methanol and water, there is obtained 3β-hydroxy-6-methyl-16α,17α-epoxy-5(6) - pregnene - 20-one melting at about 182–185° C.

*Example 5*

To a solution of 0.5 part of 4,16-pregnadiene-3,11,20-trione in 6.1 parts of dry benzene is added a solution of 0.35 part of a 62% methanolic solution of tertiary butyl hydroperoxide and 4 drops of a 35% methanolic solution of benzyltrimethylammonium hydroxide. The reaction mixture is then stirred at room temperature for 5 hours, at the end of which time 8.8 parts of benzene are added. The solution is washed with water and then with saturated sodium chloride solution. The solvent is vacuum distilled and the residue is recrystallized from a solution of acetone and petroleum ether. In this manner there is obtained 16α,17α-epoxy-4-pregnene-3,11,20-trione melting at about 187–189° C. The compound shows absorption in the ultraviolet at 238 millimicrons with an extinction coefficient of 15,200. Infrared maxima are observed at 5.82, 5.99 and 6.19 microns.

Substitution of an equimolar amount of 21-hydroxy-4,16-pregnadiene-3,11,20-trione or 21-acetoxy-4,16-pregnadiene-3,11,20-trione for the 4,16-pregnadiene-3,11,20-trione in the preceding paragraph of this example yields 16α,17α-epoxy-21-hydroxy-4-pregnene-3,11,20-trione.

What is claimed is:

1. The process for the selective epoxidation of a $\Delta^{4,16}$-3,20-dioxo steroid to the corresponding $\Delta^{4}$-16α-17α-epoxy-20-oxo steroid which comprises contacting the steroid with at least one molecular equivalent of tertiary butyl hydroperoxide in the presence of a catalytic amount of a base which is a member of the class consisting of dilute solutions of inorganic hydroxides and quaternary ammonium hydroxides in an inert solvent.

2. The process for the preparation of 16α,17α-epoxy-4-pregnene-3,20-dione which comprises contacting 16-dehydroprogesterone with at least one molecular equivalent of tertiary butyl hydroperoxide in the presence of a catalytic amount of a base which is a member of the class consisting of dilute solutions of inorganic hydroxides and quaternary ammonium hydroxides in an inert solvent.

3. The process for the preparation of 16α,17α-epoxy-1,4-pregnadiene-3,20-dione which comprises contacting 1,4,16-pregnatriene-3,20-dione with at least one molecular equivalent of tertiary butyl hydroperoxide in the presence of a catalytic amount of a base which is a member of the class consisting of dilute solutions of inorganic hydroxides and quaternary ammonium hydroxides in an inert solvent.

4. The process for the preparation of 16α,17α-epoxy-4-pregnene-3,11,20-trione which comprises contacting 4,16-pregnadiene-3,11,20-trione with at least one molecular equivalent of tertiary butyl hydroperoxide in the presence of a catalytic amount of a base which is a member of the class consisting of dilute solutions of inorganic hydroxides and quaternary ammonium hydroxides in an inert solvent.

5. The process for the preparation of 16α,17α-epoxy-21-hydroxy-4-pregnene-3,20-dione which comprises contacting a member of the class consisting of 21-hydroxy-4,16-pregnadiene-3,20-dione and 21-acetoxy-4,16-pregnadiene-3,20-dione with tertiary butyl hydroperoxide in the presence of a catalytic amount of a base which is a member of the class consisting of dilute solutions of inorganic hydroxides and quaternary ammonium hydroxides in an inert solvent.

6. The process for the preparation of 16α,17α-epoxy-21-hydroxy-1,4-pregnadiene-3,20-dione which comprises contacting a member of the class consisting of 21-hydroxy - 1,4,16-pregnatriene-3,20-dione and 21-acetoxy-1,4,16-pregnatriene-3,20-dione with at least one molecular equivalent of tertiary butyl hydroperoxide in the presence of a catalytic amount of a base which is a member of the class consisting of dilute solutions of inorganic hydroxides and quaternary ammonium hydroxides in an inert solvent.

7. The process for the preparation of 16α,17α-epoxy-21-hydroxy-4-pregnene-3,11,20-trione which comprises contacting a member of the class consisting of 21-hydroxy-4,16-pregnadiene-3,11,20-trione and 21-acetoxy-4,16-pregnadiene-3,11,20-trione with at least one molecular equivalent of tertiary butyl hydroperoxide in the presence of a catalytic amount of a base which is a member of the class consisting of dilute solutions of inorganic hydroxides and quaternary ammonium hydroxides in an inert solvent.

References Cited in the file of this patent

UNITED STATES PATENTS

| | | |
|---|---|---|
| 2,684,364 | Jones | July 20, 1954 |
| 2,705,233 | Julian | Mar. 29, 1955 |
| 2,752,340 | Ehrhart et al. | June 26, 1956 |
| 2,776,301 | Payne et al. | Jan. 1, 1957 |

OTHER REFERENCES

Yang et al.: J. Am. Chem. Soc., vol. 80 (Nov. 5, 1958), pages 5845–5848 (pages 5846 and 5848 necessary).